United States Patent

Kimata et al.

[11] Patent Number: 5,866,802
[45] Date of Patent: Feb. 2, 1999

[54] PIPING LEAKAGE DETECTING APPARATUS

[75] Inventors: Kunio Kimata, Tsuzuki-gun; Yasukiyo Ueda, Nara; Shinichi Nakane, Yamatokoriyama; Mitsuo Namba, Machida, all of Japan

[73] Assignees: Matsushita Electric Industrial Co., Ltd., Osaka; The High Pressure Gas Safety Institute of Japan, Tokyo, both of Japan

[21] Appl. No.: 860,233
[22] PCT Filed: Oct. 15, 1996
[86] PCT No.: PCT/JP96/02978
§ 371 Date: Jul. 30, 1997
§ 102(e) Date: Jul. 30, 1997
[87] PCT Pub. No.: WO97/14945
PCT Pub. Date: Apr. 24, 1997

[30] Foreign Application Priority Data

Oct. 17, 1995 [JP] Japan ................................. 7-268454

[51] Int. Cl.⁶ ................................................. G01M 3/28
[52] U.S. Cl. ........................... 73/40.5 R; 431/12; 431/16; 431/22
[58] Field of Search ............... 73/40.5 R, 49.1; 340/605; 431/12, 14, 16, 22, 89

[56] References Cited

U.S. PATENT DOCUMENTS

| 4,269,061 | 5/1981 | Hatsuno et al. |
|---|---|---|
| 4,850,530 | 7/1989 | Uecker .................................. 236/1 EB |
| 5,046,519 | 9/1991 | Stenstrom et al. |
| 5,261,268 | 11/1993 | Namba ................................. 73/40.5 R |
| 5,554,976 | 9/1996 | Miyauchi et al. .............. 73/40.5 R X |

FOREIGN PATENT DOCUMENTS

| 29 16 550 | 10/1979 | Germany . |
| 39 05 054 | 4/1990 | Germany . |

Primary Examiner—Michael Brock
Attorney, Agent, or Firm—Wenderoth, Lind & Ponack, L.L.P.

[57] ABSTRACT

A piping leakage detecting apparatus includes a high pressure gas supply source, a gas implement connected to the high pressure gas supply source via a pipeline, and a switching device mounted on the pipeline for selectively opening and closing the pipeline. A pressure detecting device is mounted between the gas implement and the switching device for detecting the gas pressure inside the pipeline. A leakage judging device is provided to judge that gas leaks when no gas is being used and when a pressure drop is detected based on an output from the pressure detecting device, while the pipeline is being opened and closed by the switching device.

20 Claims, 7 Drawing Sheets

PIPING LEAKAGE DETECTING APPARATUS

TECHNICAL FIELD

The present invention relates to a piping leakage detecting apparatus for automatically detecting the presence or absence of gas leakage on the downstream side of a pressure adjusting and supply means which is provided near a high pressure gas feed port to adjust the pressure of supply gas fed from a gas supply source to a piping system.

BACKGROUND ART

A first conventional piping leakage detecting apparatus is described with reference to FIG. 7.

In gas supply equipment shown in FIG. 7, reference numeral 151 denotes a gas container, 152 a pressure regulator, 153 a feed valve, 154 a gas meter, 156 a gas pipeline, 157 an implement valve, and 158 a gas implement. To inspect the presence or absence of gas leakage of this gas supply equipment, a pressure gauge 159 such as, for example, a manometer is connected to the pipeline 156, and the feed valve 153 and implement plugs 157 are closed with the pipeline 156 filled with gas. Then, it is checked whether or not the gas pressure in the pipeline 156 drops. If any pressure drop is not detected, it is judged that the pipeline 156 is free from gas leakage.

A second conventional piping leakage detecting apparatus is described with reference to FIG. 8.

FIG. 8 depicts a piping leakage detecting apparatus as disclosed in Japanese Patent Publication (examined) No. 2-42185. Reference numeral 156 denotes a pipeline, 160 a gas meter for outputting a flow rate signal depending on the passing gas flow, 161 an inspecting circuit for outputting a notice signal in response to the flow rate signal from the gas meter 160, and 162 an alarm for providing a notification according to the notice signal from the inspecting circuit 161. To detect leakage in the gas supply equipment, the inspecting circuit 161 transmits a flow rate signal below the minimum flow rate of the gas implement. If the flow rate signal is present for a specific period, for example, more than 30 days, it is judged that the leakage is present, and a notice signal is issued.

Next, a third conventional piping leakage detecting apparatus is described with reference to FIG. 9.

FIG. 9 depicts a piping leakage detecting apparatus as disclosed in, for example, Japanese Laid-open Patent Publication (unexamined) No. 4-93739. In this figure, reference numeral 156 denotes a pipeline, 163 a pressure sensor provided in the pipeline 156, and 164 a counting means. It is judged that gas leakage is present in this gas supply equipment when the pressure sensor 163 detects the gas pressure repeatedly within a predetermined period, and the counting means 164 counts that the number of the pressure over a predetermined pressure does not exceed a predetermined number of times, as being warmed by the fresh air during a non-use period of gas.

In the constitution of the conventional apparatus shown in FIG. 7, however, to inspect the gas leakage, an inspector must go to the location of the gas supply equipment and inspect it by stopping the use of gas. If the user of gas is a general household and the house is empty in the daytime, it is difficult to adjust the time schedule for inspection.

In the constitution of the conventional apparatus shown in FIG. 8, it takes about 30 days to detect leakage, and early discovery of gas leakage is impossible.

In the constitution of the conventional apparatus shown in FIG. 9, if the gas non-use time is as short as several minutes, the counting value is small, and gas leakage cannot be inspected.

The present invention has been developed to overcome the above-described disadvantages.

It is accordingly an objective of the present invention to provide a piping leakage detecting apparatus capable of inspecting gas leakage within a short period of time without requiring an inspector.

Another objective of the present invention is to provide a piping leakage detecting apparatus capable of detecting an accidental massive release of gas due to breakage of a pipeline by earthquake, collision, fire or the like, in addition to detection of gas leakage due to corrosion of gas piping, a crack in rubber piping, or the like.

SUMMARY OF THE INVENTION

In accomplishing the above and other objectives, the piping leakage detecting apparatus according to a first form of the present invention comprises a high pressure gas supply source, a gas implement connected to the high pressure gas supply source via a pipeline, a switching means mounted on the pipeline for selectively opening and closing the pipeline, a pressure detecting means mounted between the gas implement and the switching means for detecting a gas pressure inside the pipeline, and a leakage judging means for judging that gas leaks when no gas is being used and when a pressure drop is detected based on an output from the pressure detecting means, while the pipeline is being opened and closed by said switching means.

In a second form of the present invention, the piping leakage detecting apparatus comprises a high pressure gas supply source having a gas feed port and a pressure adjusting and supply means mounted on a pipeline communicating with the gas feed port of the high pressure gas supply source. The pressure adjusting and supply means starts the gas supply when a gas pressure inside the pipeline decreases to a predetermined supply start pressure, and stops the gas supply when the gas pressure in the pipeline increases to a supply stop pressure higher than the supply start pressure. The piping leakage detecting apparatus further comprises a pressure detecting means for detecting the gas pressure inside the pipeline and a pressure drop time measuring means for outputting a first time difference during which the gas pressure detected by the pressure detecting means decreases from the supply stop pressure to the supply start pressure after stop of gas supply, or decreases from a first specified pressure set below the supply stop pressure to a second specified pressure set above the supply start pressure. The piping leakage detecting apparatus also comprises a first leakage judge time memory means for storing a predetermined first leakage judge time range during which the gas pressure inside the pipeline decreases from the supply stop pressure to the supply start pressure or decreases from the first specified pressure to the second specified pressure when gas in the pipeline leaks, and a first leakage judging means for judging presence of gas leakage when the first time difference falls within the first leakage judge time range.

According to this form of the piping leakage detecting apparatus, the pressure adjusting and supply means for reducing the high pressure gas to the operating pressure and supplying it to a gas implement is provided on the pipeline communicating with the gas feed port of the high pressure gas supply source. In the absence of gas leakage, the pressure adjusting and supply means starts the gas supply when the pressure in the pipeline decreases, by use of gas or leakage of gas, to a predetermined supply start pressure $P_k$ as indicated on the ordinate axis in FIG. 2. The pressure adjusting and supply means maintains a gas operating pressure P3 balanced with a gas consumption Q1. When use of gas is stopped or when the amount of gas fed exceeds the amount $Q_L$ of leakage gas, the pressure adjusting and supply means stops the gas supply when the pressure in the pipeline increases to a supply stop pressure $P_p$ set higher than the supply start pressure $P_k$. This pressure adjusting and supply means is a device that is required also where the piping leakage detecting apparatus is not used. Moreover, as shown in the flow rate Q on the abscissa axis in FIG. 2, supposing that the flow rates at the start and stop of gas supply are $Q_k$ and $Q_p$, respectively, a specific flow rate $Q_L$ smaller than $Q_k$ and $Q_p$ is the amount of leakage gas to be detected.

In the presence of gas leakage while gas is not used, the gas pressure in the pipeline detected by the pressure detecting means is as shown in FIG. 3. That is, when the operating pressure P3 of gas supplied from the pressure adjusting and supply means and balanced with the gas consumption Q1 abruptly increases from the instant T1 of stop of gas use and reaches the supply stop pressure $P_p$ at time T2, supply of gas from the pressure adjusting and supply means is stopped. Thereafter, the gas pressure decreases to the supply start pressure $P_k$ as indicated by (b) in FIG. 3 depending on the amount of gas leakage. When the gas pressure decreases to the supply start pressure $P_k$ at time T3, gas is supplied again from the pressure adjusting and supply means, resulting in an abrupt increase of the gas pressure. Such operations are repeated thereafter.

According to the present invention, as shown in FIG. 3, a first specified pressure P1, slightly lower than the supply stop pressure $P_p$, and a second specified pressure P2, slightly higher than the supply start pressure $P_k$, are set. The reason for setting the first specified pressure P1 and second specified pressure P2 is to eliminate effects of transient phenomenon at the time of stop of supply or start of supply of the pressure adjusting and supply means. If such effects can be ignored or are not so large, it is possible to control by using the supply stop pressure $P_p$ and supply start pressure $P_k$.

A first time difference $T_x$ during which the gas pressure in the pipeline decreases from the first specified pressure P1 to the second specified pressure P2 varies according to the amount of leakage gas. The first time difference $T_x$ becomes short when the amount of leakage of gas is large, and long when the amount of leakage of gas is small.

Therefore, after the gas supply stop time T2, the pressure drop time measuring means measures and issues the first time difference $T_x$. Because the first leakage judge time memory means stores the predetermined first leakage judge time range, in which the gas pressure in the pipeline decreases from the first specified pressure P1 to the second specified pressure P2 when gas in the pipeline leaks, gas leakage can be detected automatically by making the first leakage judging means judge the presence of leakage when the first time difference $T_x$ falls within the first leakage judge time range.

In a third form of the present invention, the piping leakage detecting apparatus comprises a high pressure gas supply source having a gas feed port and a pressure adjusting and supply means mounted on a pipeline communicating with the gas feed port of the high pressure gas supply source. The pressure adjusting and supply means starts the gas supply when a gas pressure inside the pipeline decreases to a predetermined supply start pressure, and stops the gas supply when the gas pressure in the pipeline increases to a supply stop pressure higher than the supply start pressure. The piping leakage detecting apparatus further comprises a switching signal means for issuing switching signals when the pressure adjusting and supply means starts and stops the gas supply, a switching time difference measuring means for measuring a second time difference between the start and stop of the gas supply, a second leakage judge time memory means for storing a predetermined second leakage judge time range during which the gas pressure inside the pipeline decreases from the supply stop pressure to the supply start pressure when gas in the pipeline leaks, and a second leakage judging means for judging presence of gas leakage when the second time difference falls within the second leakage judge time range.

The third form of the present invention differs from the second form in the following points:

(1) The piping leakage detecting apparatus according to the third form of the present invention includes the switching signal means for issuing switching signals when the pressure adjusting and supply means starts and stops gas supply; and (2) As shown in FIG. 3, according to the second form of the present invention, the pressure drop time measuring means measures and outputs, after a stop of the gas supply, the first time difference $T_x$ during which the gas pressure decreases from the first specified pressure P1 to the second specified pressure P2, while according to the third form of the present invention, the switching time difference measuring means measures the second time difference between the gas supply stop time and gas supply start time based on the switching signals of the switching signal means. By so doing, the construction can be simplified while eliminating the effects of transient phenomenon as in the second form of the present invention.

The first, second, or third form of the present invention has the effect of inspecting gas leakage within a very short time without requiring an inspector, while no gas is being used.

In a fourth form of the present invention, the piping leakage detecting apparatus comprises a high pressure gas supply source having a gas feed port and a pressure adjusting and supply means mounted on a pipeline communicating with the gas feed port of the high pressure gas supply source. The pressure adjusting and supply means starts the gas supply when a gas pressure inside the pipeline decreases to a predetermined supply start pressure, and stops the gas supply when the gas pressure in the pipeline increases to a supply stop pressure higher than the supply start pressure. The piping leakage detecting apparatus further comprises a switching signal means for issuing switching signals when the pressure adjusting and supply means starts and stops the gas supply, a switching count measuring means for measuring the number of switching signals within a specific time, a switching count memory means for storing the number of switching signals within the specified time when gas in the pipeline leaks, and a third leakage judging means for judging presence of leakage when the number of switching signals measured by the switching count measuring means exceeds the number of switching signals stored in the switching count memory means.

While the third form of the present invention makes use of the second time difference for judgement of leakage by detecting the switching signals outputted from the switching signal means at the supply stop and supply start of the pressure adjusting and supply means, the fourth form of the present invention makes use of the number of times of switching within a specified time to thereby simplify the construction of the leakage judging means.

This form of the present invention has the effect of inspecting gas leakage using a simplified electronic circuit.

In a fifth form of the present invention, the piping leakage detecting apparatus further comprises a volume memory means for storing a volume inside the pipeline, and a first or second leakage judge time calculating means for calculating, when gas in the pipeline leaks, a first leakage judge time range during which the gas pressure inside the pipeline decreases from the first specified pressure to the second specified pressure or a second leakage judge time range during which the gas pressure inside the pipeline decreases from the supply stop pressure to the supply start pressure, based on the volume stored in the volume memory means and an amount of leakage gas. The first or second leakage judge time calculating means sends to the first or second leakage judge time memory means information indicative of the first or second leakage judge time range.

By this construction, the piping leakage detecting apparatus has a function of appropriately determining the first or second leakage judge time range and eliminating errors due to changes of the pressure adjusting and supply means with time.

In a sixth form of the present invention, the piping leakage detecting apparatus further comprises a volume memory means for storing a volume inside the pipeline, and a leakage judge count calculating means for calculating, when gas in the pipeline leaks, a range of the number of the switching signals within the specified time, based on the volume stored in the volume memory means and an amount of leakage gas. The leakage judge count calculating means sending to the switching count memory means information indicative of the the range of the number of the switching signals.

By this construction, the piping leakage detecting apparatus has a function of appropriately determining the range of the number of times of switching of the switching signals within a specific time.

In a seventh form of the present invention, the piping leakage detecting apparatus further comprises a pressure detecting means for detecting the gas pressure inside the pipeline, and a non-use judging means for issuing a gas implement non-use signal when the gas pressure inside the pipeline outputted from the pressure detecting means after a specified time from an instant that the gas pressure decreases to the second specified pressure or supply start pressure exceeds the supply start pressure, wherein the first, second or third leakage judging means judges presence or absence of gas leakage only when the gas implement non-use signal is issued.

This form of the present invention is intended to prevent misjudgment in which use of gas is erroneously judged as gas leakage. When gas is being used, the gas pressure in the pipeline is lower than the second specified pressure P2 or supply start pressure $P_k$ and is stabilized at the gas operating pressure P3. In contrast, in case of gas leakage, the amount of gas fed is greater than the amount of leakage gas and, hence, the gas pressure in the pipeline increases.

Accordingly, the non-use judging means can recognize non-use of gas by the increase of gas pressure in the pipeline and judges the presence of gas leakage only at this time, thus preventing the above-described misjudgment.

In an eighth form of the present invention, the piping leakage detecting apparatus further comprises an alarm means for issuing an alarm signal when the number of leakage signals outputted from the first, second or third leakage judging means exceeds a specified number within a specific period, a notice means for providing notification of the alarm signal by display, sound transmission, or wire or wireless transmission, and a gas cut-off means operated by the alarm signal.

The eighth form of the present invention is intended to prevent the piping leakage detecting apparatus from misjudging due to a temporary incidental error and to assuredly notice the alarm signal in the event of gas leakage.

In a ninth form of the present invention, the piping leakage detecting apparatus further comprises an excessive flow prevention valve mounted in the pressure adjusting and supply means at a portion of a passage communicating a high pressure side inlet and a low pressure side outlet of the pressure adjusting and supply means. The excessive flow prevention valve is designed to guarantee safety in the event of massive gas leakage accident due to large-scale destruction of the piping system by earthquake, collision or the like.

By this construction, if the piping system is broken due to earthquake, collision, fire or the like, and a huge volume of gas exceeding the maximum consumption of the consuming equipment of the user is released, the gas pressure on the low pressure side drops largely from the pressure regulatable range. As a result, the excessive flow prevention valve closes the gas passage to prevent a massive release of gas.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
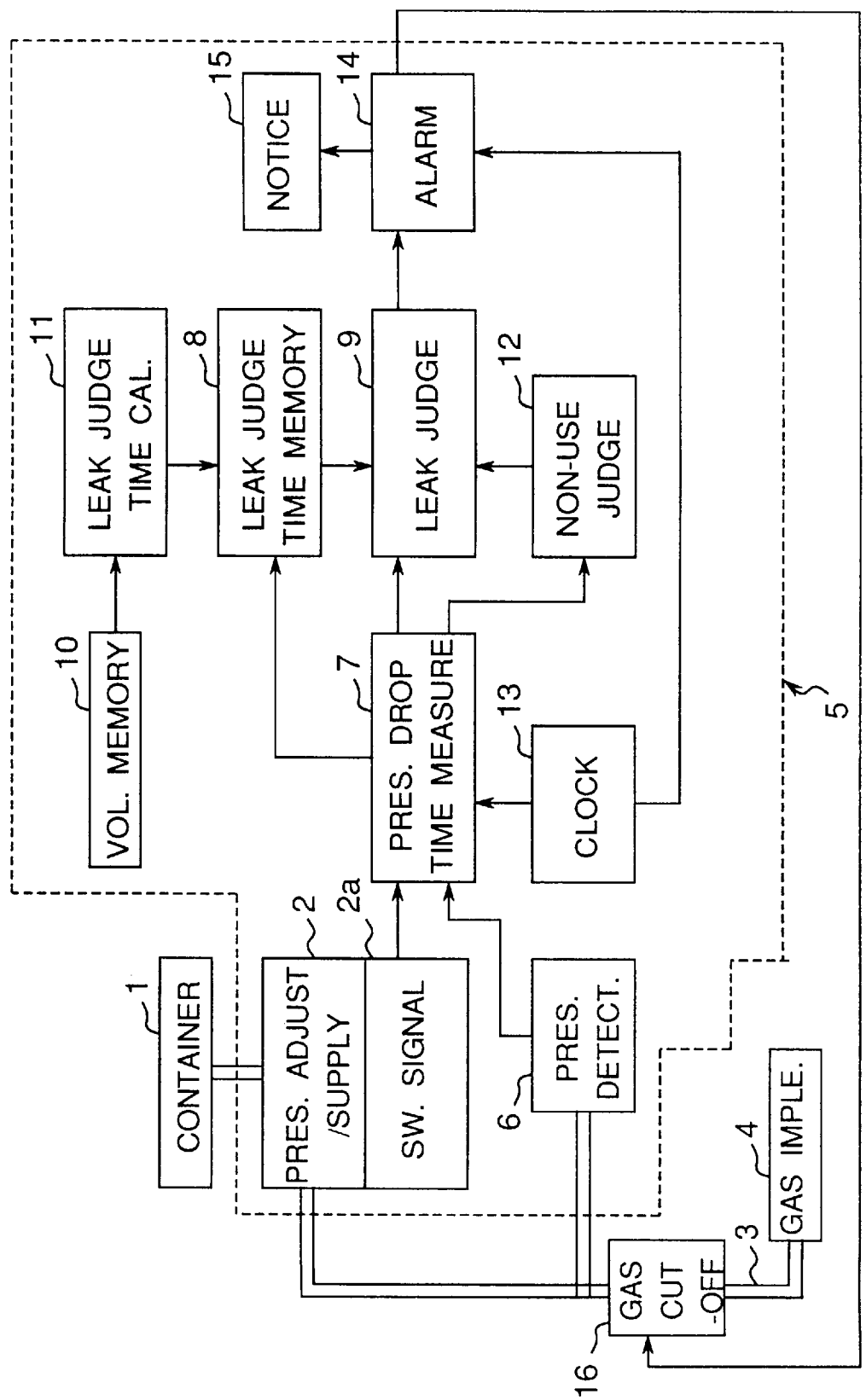
FIG. 1 is a block diagram indicating a piping leakage detecting apparatus according to a first embodiment of the present invention.

FIG. 1 depicts gas supply equipment provided with a piping leakage detecting apparatus 5 according to a first embodiment of the present invention.

Figure 2:
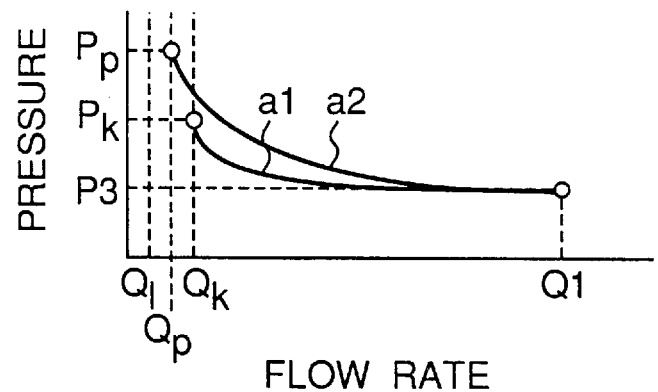
FIG. 2 is a graph indicating the operation of a pressure adjusting and supply means provided in the piping leakage detecting apparatus of FIG. 1.

As shown therein, the gas supply equipment comprises a container 1 accommodating high pressure gas or liquefied gas, a pressure adjusting and supply means 2 mounted on a pipeline 3 communicating with a gas feed port of the container 1, and a gas implement 4 connected to a terminal end of the pipeline 3. As shown in FIG. 2, the pressure adjusting and supply means 2 starts the gas supply when the pressure in the pipeline 3 is lowered to a predetermined supply start pressure $P_k$ due to use of gas or leakage of gas, and stops the gas supply when the pressure in the pipeline 3 is raised to a supply stop pressure $P_p$ set higher than the supply start pressure $P_k$ by stoppage of use of gas or if the supply gas flow rate exceeds the amount of leakage gas.

The piping leakage detecting apparatus 5 generally comprises the pressure adjusting and supply means 2, a switching signal means 2a attached thereto, a pressure detecting means 6 for detecting the gas pressure in the pipeline 3, a pressure drop time measuring means 7 and a first leakage judge time memory means 8.

Figure 3:
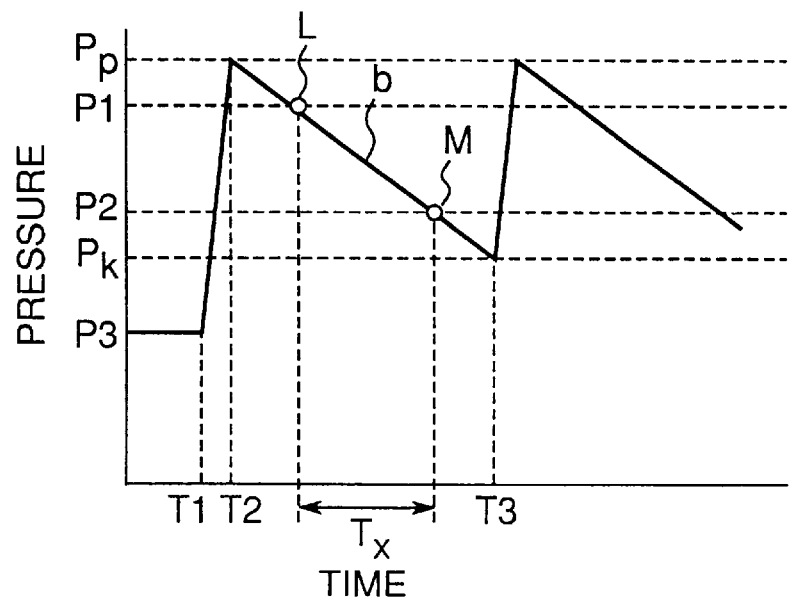
FIG. 3 is a graph indicating an example of a gas leakage detecting operation in the piping leakage detecting apparatus of FIG. 1.

The pressure drop time measuring means 7 issues a first time difference $T_x$ (pressure drop time period), as shown in FIG. 3, indicating the time difference between when the pressure detected by the pressure detecting means 6 indicates a first specified pressure P1 set below the supply stop pressure $P_p$ and when the pressure detected by the pressure detecting means 6 decreases to a second specified pressure P2 set above the supply start pressure $P_k$ after stoppage of the gas supply. On the other hand, the first leakage judge time memory means 8 stores a predetermined first leakage judge time range in which the pressure in the pipeline 3 decreases from the first specified pressure P1 to the second specified pressure P2 when the gas in the pipeline 3 leaks.

A switching time difference measuring means (not shown) and a second leakage judge time memory means 8 may be used in place of the pressure drop time measuring means 7 and the first leakage judge time memory means 8, respectively. After stoppage of the gas supply, the switching time difference measuring means measures a second time difference from the gas supply stop time T2 till the gas supply start time T3 based on a switching signal outputted from the switching signal means 2a. The second leakage judge time memory means 8 stores a predetermined second leakage judge time range in which the pressure in the pipeline 3 decreases from the pressure $P_p$ at the gas supply stop time T2 to the pressure $P_k$ at the gas supply start time T3 when the gas in the pipeline 3 leaks.

Alternatively, a switching count measuring means (not shown) and a switching count memory means 8 may be used in place of the pressure drop time measuring means 7 and the first leakage judge time memory means 8, respectively. The switching count measuring means measures the number of times of switching by the switching signal means 2a within a specific time. On the other hand, the switching count memory means 8 stores a switching count range indicating the number of switching of the switching signal means 2a occurring at the supply start and supply stop, when the pressure in the pipeline 3 drops.

The piping leakage detecting apparatus also comprises a first leakage judging means 9 for judging the presence of leakage when the first time difference measured by the pressure drop time measuring means 7 is within the first leakage judge time range. The first leakage judging means 9 may be replaced by a second leakage judging means 9 for judging the presence of leakage when the second time difference is within the second leakage judge time range, or by a third leakage judging means 9 for judging the presence of leakage when the switching count measured by the switching count measuring means is within a leakage judging range of the switching count memory means 8.

Figure 5:
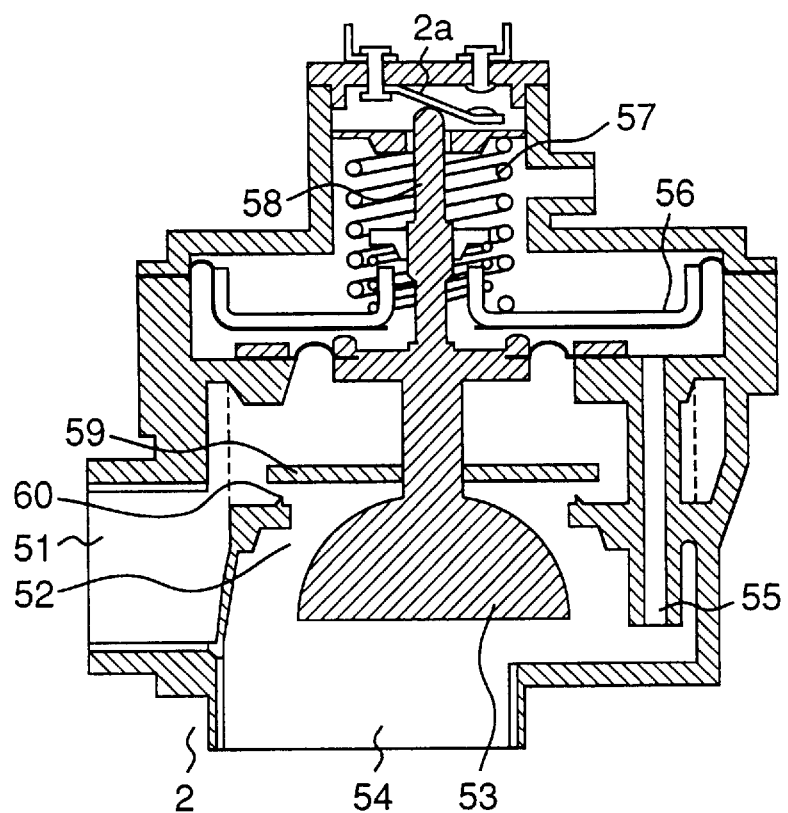
FIG. 5 is a vertical sectional view of the pressure adjusting and supply means and switching signal means provided in the piping leakage detecting apparatus of FIG. 1.

As shown in FIG. 5, the pressure adjusting and supply means 2 provided with the switching signal means 2a has a high pressure side inlet 51, a valve body 53 mounted therein, a low pressure side outlet 54, and a gas passage leading from the high pressure side inlet 51 to the low pressure side outlet 54 through a gap 52 defined around the valve body 53. The low pressure side outlet 54 communicates with the lower side of a diaphragm 56 by way of a pressure leading pipe 55. A spring 57 is provided to push down the diaphragm 56, and the gas pressure causes the diaphragm 56 to move the valve body 53 up and down against the force of the spring 57. A bar 58 is secured to or otherwise integrally formed with the valve body 53 and has an upper end which moves the switching signal means 2a.

By this construction, when the use of low pressure side gas is stopped, the low pressure side pressure increases to push up the diaphragm 56. As a result, the valve body 53 closes the gap 52 and stops gas supply from the high pressure side. At the same time, the bar 58 moves upward to close the contact of the switching signal means 2a, which in turn outputs a supply stop signal.

When the low pressure side gas is used, the gas pressure drops, and the force to push up the diaphragm 56 decreases. As a result, the diaphragm 56 together with the valve body 53 moves downward, and the gap 52 is opened to supply gas. At this time, the bar 58 moves downward to open the contact of the switching signal means 2a, which in turn outputs a supply start signal.

It is to be noted here that although a switching contact is used in the above embodiment, it is also possible to open and close a contact of a reed relay using a magnet fitted to the upper end of the bar 58. Alternatively, a light emitting diode and a photo transistor may be combined so that the bar 58 may open and close the passage of light from the light emitting diode for switching of the photo transistor.

The pressure adjusting and supply means 2 also has an excessive flow prevention valve 59 which moves together with the bar 58. The excessive flow prevention valve 59 confronts a valve seat 60 provided at a portion of the passage communicating between the high pressure side inlet 51 and low pressure side outlet 54.

The excessive flow prevention valve 59 is kept opened during normal use of gas, but when a great amount of gas exceeding the maximum consumption of the consumer's equipment is released through broken gas piping due to earthquake, collision, fire or the like, the gas pressure on the low pressure side also decreases significantly out of the pressure regulatable range. As a result, the diaphragm 56 moves largely, and the excessive flow prevention valve 59 is pressed against the valve seat 60 to close the gas passage, thereby preventing release of gas.

The above embodiment is further described below, taking the case of using LP gas.

The container 1 is filled with LP gas, and vaporized LP gas has a high pressure of about 14.5 kg/cm$^2$. The pressure adjusting and supply means 2 functions to adjust to a pressure of about 280 mmH$_2$O suited to the use of gas.

FIG. 2 is a graph indicating the relationship between the pressure and flow rate on the low pressure side of the pressure adjusting and supply means 2.

In FIG. 2, the ordinate axis represents the low pressure side adjusting pressure P of the pressure adjusting and supply means 2, while the abscissa axis represents the gas flow rate Q. When the gas implement 4 starts to use gas, the pressure on the low pressure side of the pressure adjusting and supply means 2 drops, and the internal valve of the pressure adjusting and supply means 2 opens to cause gas to flow. The pressure at this time is called the gas supply start pressure and expressed by $P_k$. The flow rate at the supply start is $Q_k$. The gas pressure decreases as the flow rate increases along a curve (a1), and drops to a pressure P3 when the gas implement 4 consumes a gas flow Q1. When the use of the gas implement 4 is stopped, the pressure increases along a curve (a2), and the gas supply is stopped at a supply stop pressure $P_p$. The flow rate at the supply stop is $Q_p$.

The minimum flow rate ($Q_p$ or $Q_k$) of the pressure adjusting and supply means 2 is set to a flow rate exceeding $Q_L$ which is a reference flow rate for judgment of gas leakage of the pipeline 3.

When the gas implement 4 is not used, the pressure in the pipeline 3 is kept at the pressure $P_p$ if neither gas leakage nor temperature change occurs. If, however, a slight leakage occurs in the pipeline 3, the pressure in the pipeline 3 decreases from the pressure $P_p$ with time. When the pressure decreases to the pressure $P_k$, the pressure adjusting and supply means 2 causes gas to flow. Because the flow rate of gas supplied at this time is greater than the flow rate $Q_L$ of the slight leakage, the gas pressure in the pipeline 3 increases to the supply stop pressure $P_p$, resulting in stop of gas supply.

This mode is shown in FIG. 3. In FIG. 3, the ordinate axis represents the pressure P in the pipeline 3, while the abscissa axis represents time T.

A curve (b) indicates gas pressure changes. While the gas is being used, the inside of the pipeline 3 is kept at a pressure of P3, but when the use is stopped at time T1, the gas pressure in the pipeline 3 increases abruptly and stops at the pressure $P_p$. This moment is time T2. If the pipeline 3 leaks, the pressure decreases slowly with time. When the pressure decreases to the pressure $P_k$, the gas is supplied and the pressure thereof begins to increase to $P_p$ again. Thereafter, such pressure changes are repeated.

According to the regulations for household LP gas supply equipments, the occlusion pressure is limited below 350 $mmH_2O$, and the pressure during use of gas must be maintained between 230 and 330 $mmH_2O$. When the piping leakage detecting apparatus of the present invention is used, it is preferred that the supply stop pressure $P_p$ of the pressure adjusting and supply means 2 is about 340 $mmH_2O$, and the supply start pressure $P_k$ is about 300 $mmH_2O$.

In FIG. 3, P1 is a first specified pressure, and P2 is a second specified pressure. Time $T_x$ between an intersection L of a decreasing portion of the pressure curve (b) with the first specified pressure P1 and an intersection M with the second specified pressure P2 is the first time difference to be measured by the pressure drop time measuring means 7. The first specified pressure P1 is about 325 to 335 $mmH_2O$ below the supply stop pressure $P_p$, while the second specified pressure P2 is about 300 to 320 $mmH_2O$ between the supply start pressure $P_k$ and the supply stop pressure $P_p$. It is preferred that the difference between the first and second specified pressures be 10 to 30 $mmH_2O$.

In this embodiment, $P_p$=340 $mmH_2O$, P1=330 $mmH_2O$, P2=310 $mmH_2O$, $P_k$=300 $mmH_2O$, and P3=280 $mmH_2O$.

In a gas piping equipment with an inner volume of 20 liters, the operation of leakage detection is described below, taking the case of a leakage judging flow rate of 3 liters/h.

The time in which the gas pressure in the pipeline decreases from the first specified pressure P1=330 $mmH_2O$ to the second specified pressure P2=310 $mmH_2O$ is 7 seconds when starting to use gas of 500 kilocalories close to the lowest gas consumption in the gas implement for household use. If the gas is leaking at 3 liters/h, it takes 48 seconds. Without use of gas, when the ambient temperature is about 20° C. and drops by 10° C. per hour, it takes 400 seconds. Accordingly, the first leakage judging time range is determined to range from 15 seconds to 200 seconds.

The operation of leakage detection according to a modification is described below. The time in which the gas pressure in the pipeline decreases from the supply stop pressure $P_p$=340 $mmH_2O$ to the supply start pressure $P_k$=300 $mmH_2O$ is 13.8 seconds when starting to use gas of 500 kilocalories close to the lowest gas consumption in the gas implement for household use. If the gas is leaking at 3 liters/h, it takes 96 seconds. Without use of gas, when the ambient temperature is about 20° C. and drops by 10° C. per hour, it takes 400 seconds. Accordingly, the second leakage judging time range is determined to range from 25 seconds to 200 seconds.

The operation of leakage detection according to another modification is described below. When the gas pressure in the pipeline decreases from the supply stop pressure $P_p$=340 $mmH_2O$ to the supply start pressure $P_k$=300 $mmH_2O$, the number of times of switching per 10 minutes is one or two times from the start or stop of use of the gas implement for household use. It is six times when the gas is leaking at 3 liters/h. It is one time when the ambient temperature is about 20° C. and drops by 10° C. per hour without use of gas. Considering an allowance in the number of times of switching to be stored in the switching count memory means 8, it is set at five times or more per 10 minutes.

The first or second leakage judge time range is thus calculated beforehand, and it can be stored in the first or second leakage judge time memory means by an operator. It is also possible to constitute as described below.

As shown in FIG. 1, the piping leakage detecting apparatus 5 may further comprise a volume memory means 10 for storing the volume in the pipeline 3, and a first leakage judge time calculating means 11 for calculating, if gas in the pipeline 3 leaks, a first leakage judge time range in which the gas pressure decreases from the first specified pressure P1 to the second specified pressure P2, based on the stored volume and the amount of leakage, and sending such information to the first leakage judge time memory means 8.

The first leakage judge time calculating means 11 may be replaced by a second leakage judge time calculating means for calculating, if gas in the pipeline 3 leaks, a second leakage judge time range in which the gas pressure decreases from the pressure $P_p$ at the supply stop time T2 to the pressure $P_k$ at the supply start time T3, based on the stored volume and the amount of leakage, and sending such information to the second leakage judge time memory means 8.

By this constitution, even if the supply start pressure $P_k$ or supply stop pressure $P_p$ changes when the pressure adjusting and supply means 2 changes with time, the criterion also varies according to such changes and, hence, errors which have been hitherto caused by the changes of the pressure adjusting and supply means 2 can be avoided.

In this embodiment, in the pipeline volume of 20 liters, when the pressure at the supply stop time T2 changes from 340 $mmH_2O$ to 330 $mmH_2O$, and the pressure at the supply start time T3 remains at 300 $mmH_2O$, the pressure difference decreases from 40 $mmH_2O$ to 30 $mmH_2O$. According to calculation with the use of Boyle's law, the second leakage judge time is shortened from 96 seconds to 72 seconds by 75% when the leakage flow rate is 3 liters/h. It is therefore preferred that the second leakage judge time range be shortened by 75%

The volume memory means 10 is preferably provided with a function of automatically calculating the pipeline volume by inputting the type and length of the pipeline used in the equipment in which the piping leakage detecting apparatus of the present invention is installed. The first or second leakage judge time calculating means 11 is preferably designed to accept ambient temperature information and calculate the first or second leakage judge time range in consideration of such temperature information.

The range of the number of times of switching of the switching signals within the specified time to be judged as leakage is determined as described previously, and it can be stored in the leakage switching count memory means. Same as above, however, the volume memory means and leakage judge count calculating means may be provided.

The piping leakage detecting apparatus 5 of the above embodiment has a function of preventing an erroneous operation when gas is used during gas leakage judgement. More specifically, in FIGS. 1 to 3, after a specific time $T_s$ from the instant that the gas pressure decreases to the second specified pressure P2 or supply start pressure $P_k$, when the pressure in the pipeline 3 issued from the pressure detecting means 6 is greater than the second specified pressure P2 or supply start pressure $P_k$, a non-use judging means 12 issues a gas implement non-use signal. In addition, the first, second or third leakage judging means 9 has a function of judging the presence or absence of leakage if the gas implement non-use signal is issued.

By this construction, during use of gas, the pressure in the pipeline 3 is stabilized at the gas operating pressure P3 at which the supply and consumption are balanced. In the event of gas leakage, because the amount of gas supply exceeds the amount of gas leakage, the pressure in the pipeline 3 inevitably increases. Accordingly, the non-use judging means 12 can confirm non-use of gas based on an increased gas pressure in the pipeline. When the judging time is set, based on time information from a clock means 13, to the time after a specific time $T_s$ from the instant that the gas pressure decreases to the second specified pressure P2 or supply start pressure $P_k$, it is easy to judge the non-use of gas.

Figure 4:
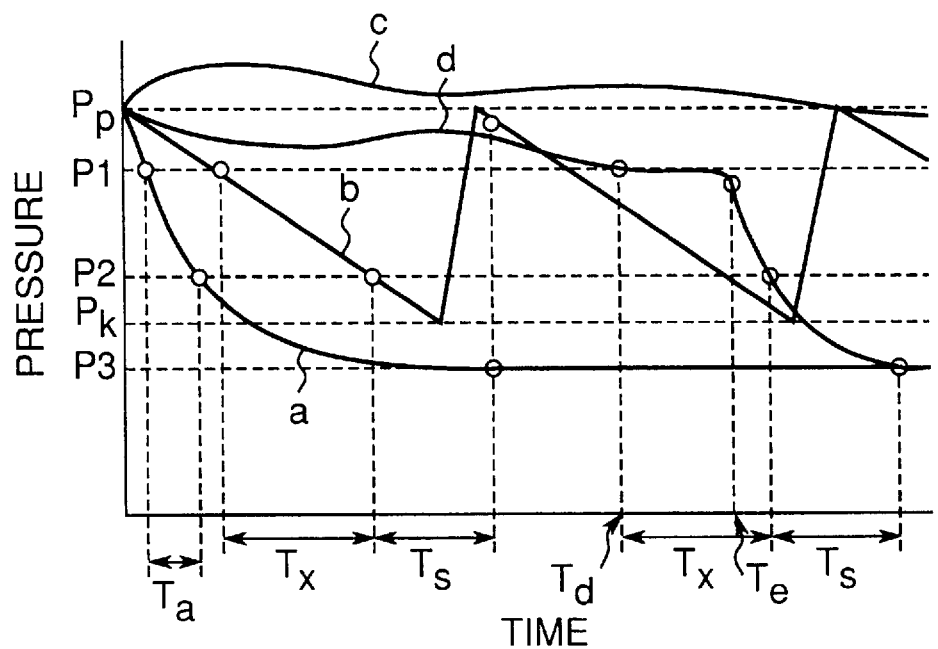
FIG. 4 is a graph indicating another example of the gas leakage detecting operation in the piping leakage detecting apparatus of FIG. 1.

FIG. 4 shows various patterns of gas pressure changes when gas is being used and the use thereof is stopped. A curve (a) shows pressure changes in the pipeline 3 during use of gas. When gas is not used, the gas pressure in the pipeline 3 is maintained at the supply stop pressure $P_p$ if there is no gas leakage. When the use of gas is started, the gas pressure drops from the supply stop pressure $P_p$ to the first specified pressure P1, and to the second specified pressure P2, and then to the supply start pressure $P_k$ at which the pressure adjusting and supply means 2 starts to supply gas. Thereafter, the gas is supplied continuously at the gas operating pressure P3 at which the gas supply and consumption are balanced.

A curve (b) shows pressure changes in the pipeline 3 in the presence of gas leakage, while a curve (c) shows pressures changes in the pipeline 3 with ambient temperature changes when no gas is being used and with leaks.

A curve (d) shows pressure changes in the pipeline 3 when the ambient temperature decreases and when no gas leaks. According to the curve (d), when no gas is being used, the gas pressure drops to the first specified pressure P1 at time $T_d$ due to fall of ambient temperature. When the use of gas is started at time $T_e$, the gas pressure abruptly decreases to the second specified pressure P2. In this case, because the time difference between $T_d$ and the time when the gas pressure drops to the second specified pressure P2 exactly coincides with the leakage judge time $T_x$, it is misjudged that gas leakage is present. Although this is a very rare case, such misjudgment can be avoided as mentioned above by adding the non-use judging means 12 and by adding to the first or second leakage judging means 9 a function of judging the presence or absence of leakage, when a gas implement non-use signal is issued by the non-use judging means 12. According to this construction, whether gas is being used is judged by measuring the gas pressure, for example, immediately after a specific time $T_s$ from the instant that the gas pressure decreases to the second specified pressure P2. According to the curve (b), the gas pressure exceeds the second specified pressure P2 when no gas is being used, while according to the curve (d), the gas pressure decreases to the gas operating pressure P3 when gas is being used. It is therefore possible to judge that no gas is being used when the gas pressure measured in the above-described manner is greater than the second specified pressure P2. For example, $T_s$ ranges from 5 seconds to 30 seconds.

As shown in FIG. 1, the piping leakage detecting apparatus 5 further comprises an alarm means 14 for issuing an alarm signal when the number of times of signal output indicating the presence of leakage and issued from the first, second or third leakage judging means 9 exceeds a specified number of times within a specific period, and a notice means 15 for displaying the alarm signal or transmitting it through voice transmission, or wire or wireless transmission. These means provide a function of preventing misjudgment which may be otherwise caused by temporary erroneous operations.

Supposing that the specific period ranges from 1 day to 7 days, when the number of times of signal output indicating the presence of leakage and issued from the first, second or third leakage judging means 9 is one or two times within this period, the alarm from the alarm means 14 is cancelled as being an erroneous operation. On the other hand, when exceeding three times, the alarm means 14 judges that a slight leakage occurs and issues an alarm signal. When the alarm signal is issued, the notice means 15 displays the alarm signal or transmits it though voice transmission, or wire or wireless transmission. Finally, the gas supply is cut off by a gas cut-off means 16 such as, for example, a solenoid cut-off valve or solenoid switching valve that operates in response to the alarm signal from the alarm means 14.

Figure 6:
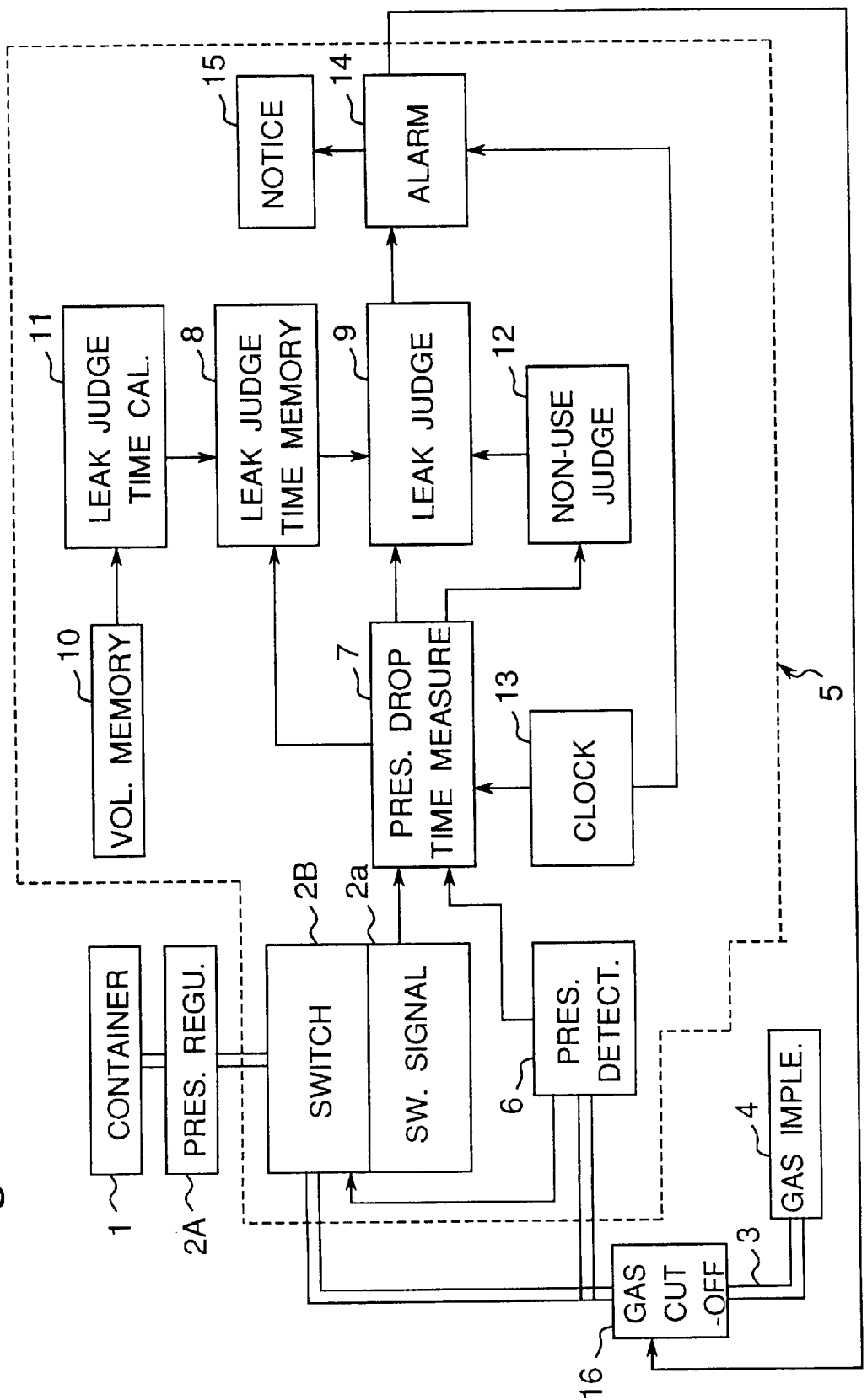
FIG. 6 is a diagram similar to FIG. 1, but indicating a piping leakage detecting apparatus according to a second embodiment of the present invention.
Figure 7:
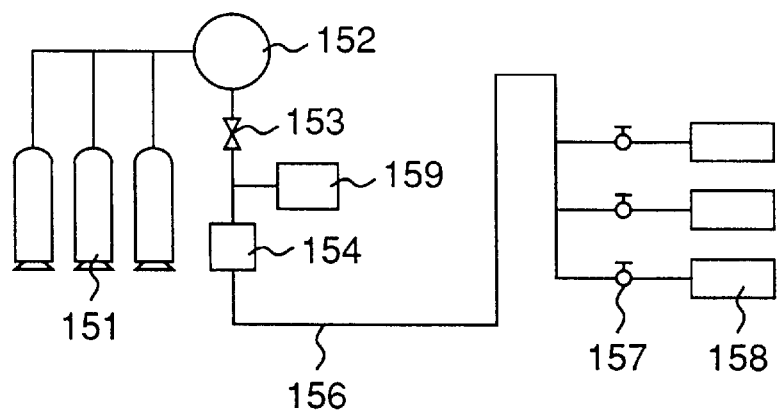
FIG. 7 is a block diagram indicating a first conventional piping leakage detecting apparatus.
Figure 8:
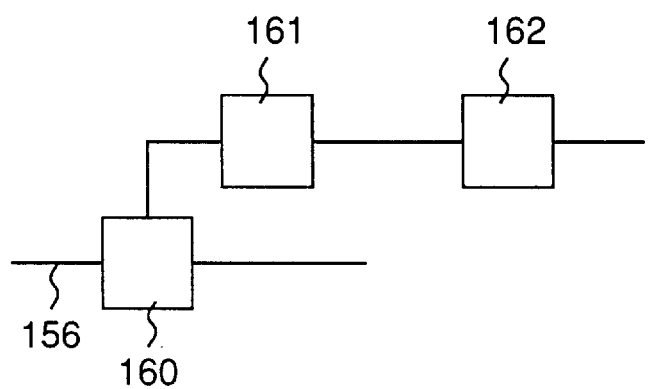
FIG. 8 is a block diagram indicating a second conventional piping leakage detecting apparatus.
Figure 9:
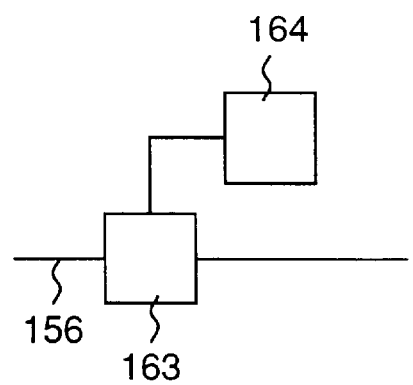
FIG. 9 is a block diagram indicating a third conventional piping leakage detecting apparatus.

It is to be noted here that although in the above-described embodiment the pressure adjusting means has been described as comprising, as shown in FIG. 5, a diaphragm 56 carried by an elastic member such as a spring 57 and a valve body 53 held by this diaphragm 56 to operate in response to the gas pressure, and is of one-piece construction for controlling both the gas pressure adjustment and the opening and closing of the gas passage, the pressure adjusting means may have a construction as shown in FIG. 6, in which a mere pressure regulator 2A provided on the outlet side of the container 1 and a separate switching means 2B such as a solenoid valve operate in combination with each other. In this case, the switching means 2B is controlled to open or close in response to the output from the pressure detecting means 6. The pressure adjusting means is, therefore, not limited to a specific construction and may have any other construction as far as the operation is the same as in the embodiment of FIG. 5. All such modifications are commonly called the pressure adjusting means.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

We claim:

1. A piping leakage detecting apparatus for use with a high pressure gas supply source having a gas feed port and a pipeline communicating with the gas feed port of the high pressure gas supply source, said apparatus comprising:

a pressure adjusting and supply means, to be mounted on the pipeline, operable for starting gas supply when a gas pressure inside the pipeline decreases to a predetermined supply start pressure, and for stopping gas supply when the gas pressure in the pipeline increases to a supply stop pressure higher than said supply start pressure;

a pressure detecting means for detecting the gas pressure inside the pipeline;

a pressure drop time measuring means for outputting a pressure drop time period during which the gas pressure detected by said pressure detecting means decreases from said supply stop pressure to said supply start pressure after stoppage of gas supply, or during which the gas pressure detected by said pressure detecting means decreases from a first specified pressure set below said supply stop pressure to a second specified pressure set above said supply start pressure;

a leakage judge time memory means for storing a predetermined leakage judge time period within which the gas pressure inside the pipeline would decrease from said supply stop pressure to said supply start pressure when gas in the pipeline leaks or within which the gas pressure inside the pipeline would decrease from said first specified pressure to said second specified pressure when gas in the pipeline leaks; and a leakage judging means for judging presence of gas leakage, and outputting a leakage signal, when said pressure drop time period falls within said leakage judge time period.

2. The piping leakage detecting apparatus according to claim 1, further comprising a volume memory means for storing a volume inside the pipeline, and a leakage judge time calculating means for calculating, when gas in said pipeline leaks, a leakage judge time period during which the gas pressure inside the pipeline decreases from said first specified pressure to said second specified pressure based on the volume stored in said volume memory means and an amount of leakage gas, wherein said leakage judge time calculating means is operable for sending information indicative of said leakage judge time period to said leakage judge time memory means.

3. The piping leakage detecting apparatus according to claim 1, further comprising a non-use judging means for issuing a gas implement non-use signal when the gas pressure inside the pipeline, detected by said pressure detecting means after a specified time from an instant that the gas pressure decreases to said second specified pressure or said supply start pressure, exceeds said supply start pressure, wherein said leakage judging means judges presence or absence of gas leakage only when said gas implement non-use signal is issued.

4. The piping leakage detecting apparatus according to claim 1, further comprising an alarm means for issuing an alarm signal when a number of leakage signals outputted from said leakage judging means exceeds a specified number within a specific period, a notice means for providing a notification of said alarm signal by display, sound transmission, or wire or wireless transmission, and a gas cut-off means operated by said alarm signal.

5. The piping leakage detecting apparatus according to claim 1, wherein said pressure adjusting and supply means comprises a high pressure side inlet, a low pressure side outlet, and a passage communicating said high pressure side inlet and said low pressure side outlet, and said piping leakage detecting apparatus further comprises an excessive flow prevention valve mounted in said pressure adjusting and supply means at a portion of said passage communicating said high pressure side inlet and said low pressure side outlet.

6. The piping leakage detecting apparatus according to claim 1, further comprising the high pressure gas supply source having the gas feed port.

7. The piping leakage detecting apparatus according to claim 1, further comprising a volume memory means for storing a volume inside the pipeline, and a leakage judge time calculating means for calculating, when gas in said pipeline leaks, a leakage judge time period during which the gas pressure inside the pipeline decreases from said supply stop pressure to said supply start pressure based on the volume stored in said volume memory means and an amount of leakage gas, wherein said leakage judge time calculating means is operable for sending information indicative of said leakage judge time period to said leakage judge time memory means.

8. A piping leakage detecting apparatus for use with a high pressure gas supply source having a gas feed port and a pipeline communicating with the gas feed port of the high pressure gas supply source, said apparatus comprising:

a pressure adjusting and supply means, to be mounted on the pipeline, operable for starting gas supply when a gas pressure inside the pipeline decreases to a predetermined supply start pressure, and for stopping gas supply when the gas pressure in the pipeline increases to a supply stop pressure higher than said supply start pressure;

a switching signal means for issuing switching signals when said pressure adjusting and supply means starts and stops gas supply;

a switching time difference measuring means for measuring a switching time period between start and stop of gas supply;

a leakage judge time memory means for storing a predetermined leakage judge time period within which the gas pressure inside the pipeline would decrease from said supply stop pressure to said supply start pressure when gas in the pipeline leaks; and a leakage judging means for judging presence of gas leakage, and outputting a leakage signal, when said switching time period falls within said leakage judge time period.

9. The piping leakage detecting apparatus according to claim 8, further comprising a volume memory means for storing a volume inside the pipeline, and a leakage judge time calculating means for calculating, when gas in said pipeline leaks, a leakage judge time period during which the gas pressure inside the pipeline decreases from said first specified pressure to said second specified pressure based on the volume stored in said volume memory means and an amount of leakage gas, wherein said leakage judge time calculating means is operable for sending information indicative of said leakage judge time period to said leakage judge time memory means.

10. The piping leakage detecting apparatus according to claim 8, further comprising a pressure detecting means for detecting the gas pressure inside the pipeline, and a non-use judging means for issuing a gas implement non-use signal when the gas pressure inside the pipeline, detected by said pressure detecting means after a specified time from an instant that the gas pressure decreases to said second specified pressure or said supply start pressure, exceeds said supply start pressure, wherein said leakage judging means judges presence or absence of gas leakage only when said gas implement non-use signal is issued.

11. The piping leakage detecting apparatus according to claim 8, further comprising an alarm means for issuing an alarm signal when a number of leakage signals outputted from said leakage judging means exceeds a specified number within a specific period, a notice means for providing a notification of said alarm signal by display, sound transmission, or wire or wireless transmission, and a gas cut-off means operated by said alarm signal.

12. The piping leakage detecting apparatus according to claim 8, wherein said pressure adjusting and supply means comprises a high pressure side inlet, a low pressure side outlet, and a passage communicating said high pressure side inlet and said low pressure side outlet, and said piping leakage detecting apparatus further comprises an excessive flow prevention valve mounted in said pressure adjusting and supply means at a portion of said passage communicating said high pressure side inlet and said low pressure side outlet.

13. The piping leakage detecting apparatus according to claim 8, further comprising the high pressure gas supply source having the gas feed port.

14. The piping leakage detecting apparatus according to claim 8, further comprising a volume memory means for storing a volume inside the pipeline, and a leakage judge time calculating means for calculating, when gas in said pipeline leaks, a leakage judge time period during which the gas pressure inside the pipeline decreases from said supply stop pressure to said supply start pressure based on the volume stored in said volume memory means and an amount of leakage gas, wherein said leakage judge time calculating means is operable for sending information indicative of said leakage judge time period to said leakage judge time memory means.

15. A piping leakage detecting apparatus for use with a high pressure gas supply source having a gas feed port and a pipeline communicating with the gas feed port of the high pressure gas supply source, said apparatus comprising:

a pressure adjusting and supply means, to be mounted on the pipeline, operable for starting gas supply when a gas pressure inside the pipeline decreases to a predetermined supply start pressure, and for stopping gas supply when the gas pressure in the pipeline increases to a supply stop pressure higher than said supply start pressure;

a switching signal means for issuing switching signals when said pressure adjusting and supply means starts and stops gas supply;

a switching count measuring means for measuring the number of switching signals within a specified time period;

a switching count memory means for storing the number of switching signals which would occur within said specified time period when gas in the pipeline leaks; and a leakage judging means for judging presence of leakage, and outputting a leakage signal, when the number of switching signals measured by said switching count measuring means exceeds the number of switching signals stored in said switching count memory means.

16. The piping leakage detecting apparatus according to claim 15, further comprising a volume memory means for storing a volume inside the pipeline, and a leakage judge count calculating means for calculating, when gas in said pipeline leaks, a range of the number of said switching signals within said specified time period, based on the volume stored in said volume memory means and an amount of leakage gas, said leakage judge count calculating means operable for sending to said switching count memory means information indicative of said range of the number of said switching signals.

17. The piping leakage detecting apparatus according to claim 15, further comprising a pressure detecting means for detecting the gas pressure inside the pipeline, and a non-use judging means for issuing a gas implement non-use signal when the gas pressure inside the pipeline, detected by said pressure detecting means after a specified time from an instant that the gas pressure decreases to said second specified pressure or said supply start pressure, exceed said supply start pressure, wherein said leakage judging means judges presence or absence of gas leakage only when said gas implement non-use signal is issued.

18. The piping leakage detecting apparatus according to claim 15, further comprising an alarm means for issuing an alarm signal when a number of leakage signals outputted from said leakage judging means exceeds a specified number within a specific period, a notice means for providing notification of said alarm signal by display, sound transmission, or wire or wireless transmission, and a gas cut-off device operated by said alarm signal.

19. The piping leakage detecting apparatus according to claim 15, wherein said pressure adjusting and supply means comprises a high pressure side inlet, a low pressure side outlet, and a passage communicating said high pressure side inlet and said low pressure side outlet, and said piping leakage detecting apparatus further comprises an excessive flow prevention valve mounted in said pressure adjusting and supply means at a portion of said passage communicating said high pressure side inlet and said low pressure side outlet.

20. The piping leakage detecting apparatus according to claim 15, further comprising the high pressure gas supply source having the gas feed port.

* * * * *